US012370680B2

(12) United States Patent
Kim et al.

(10) Patent No.: US 12,370,680 B2
(45) Date of Patent: Jul. 29, 2025

(54) ROBOT FOR ACQUIRING LEARNING DATA AND METHOD FOR CONTROLLING THEREOF

(71) Applicant: SAMSUNG ELECTRONICS CO., LTD., Suwon-si (KR)

(72) Inventors: Yongkook Kim, Suwon-si (KR); Saeyoung Kim, Suwon-si (KR); Junghoe Kim, Suwon-si (KR); Hyeontaek Lim, Suwon-si (KR); Boseok Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 123 days.

(21) Appl. No.: 18/224,881

(22) Filed: Jul. 21, 2023

(65) Prior Publication Data
US 2024/0017406 A1    Jan. 18, 2024

Related U.S. Application Data

(63) Continuation of application No. PCT/KR2023/005199, filed on Apr. 18, 2023.

(30) Foreign Application Priority Data

Jul. 18, 2022   (KR) .................. 10-2022-0088584

(51) Int. Cl.
*B25J 9/16*       (2006.01)
*B25J 11/00*      (2006.01)
(Continued)

(52) U.S. Cl.
CPC ........... *B25J 9/163* (2013.01); *B25J 11/0005* (2013.01); *G10L 15/22* (2013.01); *G10L 15/26* (2013.01)

(58) Field of Classification Search
USPC .................................................. 700/245–264
See application file for complete search history.

(56) References Cited

U.S. PATENT DOCUMENTS

| 6,842,734 B2 | 1/2005 | Yamada et al. |
| 8,185,399 B2 | 5/2012 | Di Fabbrizio et al. |

(Continued)

FOREIGN PATENT DOCUMENTS

| JP | 2001-215990 A | 8/2001 |
| KR | 10-0251003 B1 | 4/2000 |

(Continued)

OTHER PUBLICATIONS

Search Report (PCT/ISA/210) dated Jul. 17, 2023 issued by the ISA for International Application No. PCT/KR2023/005199.

(Continued)

*Primary Examiner* — Jonathan L Sample
(74) *Attorney, Agent, or Firm* — Sughrue Mion, PLLC

(57) ABSTRACT

A robot transmits a command to control an external device around the robot based on pre-stored environment information while the robot is operating in a learning mode. The external device makes a noise as part of its operation. Also, the robot outputs user speech for learning while the external device is operating. The robot learns a speech recognition model based on the noise and speech of a user acquired through a microphone of the robot. The speech recognition model is then used by the robot or by another device to better understand the user when the user talks. The robot is then able to more accurately understand and properly execute speech commands from the user.

20 Claims, 10 Drawing Sheets

(51) Int. Cl.
*G10L 15/22* (2006.01)
*G10L 15/26* (2006.01)

(56) References Cited

U.S. PATENT DOCUMENTS

| | | | |
|---|---|---|---|
| 9,275,638 B2* | 3/2016 | Meloney | G10L 15/063 |
| 9,302,393 B1* | 4/2016 | Rosen | G06N 3/008 |
| 9,697,822 B1* | 7/2017 | Naik | G10L 15/22 |
| 10,127,905 B2 | 11/2018 | Lee et al. | |
| 11,037,548 B2 | 6/2021 | Kim | |
| 11,055,356 B2* | 7/2021 | Ritchey | G06N 20/00 |
| 11,164,586 B2* | 11/2021 | Kim | G10L 25/84 |
| 11,250,843 B2 | 2/2022 | Yun | |
| 11,282,522 B2* | 3/2022 | Chae | G06V 10/82 |
| 11,443,747 B2* | 9/2022 | Chae | G06F 40/20 |
| 11,457,983 B1* | 10/2022 | Roh | A61B 34/25 |
| 11,501,794 B1* | 11/2022 | Kim | G10L 15/1815 |
| 11,551,662 B2 | 1/2023 | Yun et al. | |
| 11,583,998 B2* | 2/2023 | Moon | B25J 9/163 |
| 2002/0158599 A1* | 10/2002 | Fujita | G10L 15/26 704/E15.045 |
| 2003/0097261 A1 | 5/2003 | Jeon et al. | |
| 2016/0199977 A1* | 7/2016 | Breazeal | B25J 11/0015 700/246 |
| 2017/0076719 A1* | 3/2017 | Lee | G10L 15/20 |
| 2019/0348021 A1* | 11/2019 | Trim | G06F 18/23 |
| 2019/0385600 A1* | 12/2019 | Kim | H04W 72/1268 |
| 2019/0385614 A1* | 12/2019 | Kim | G10L 15/22 |
| 2019/0392818 A1 | 12/2019 | Lee | |
| 2020/0005766 A1* | 1/2020 | Kim | G10L 15/02 |
| 2020/0258535 A1* | 8/2020 | Vatanparvar | A61B 5/4803 |
| 2020/0368616 A1* | 11/2020 | Delamont | H04N 13/239 |
| 2020/0374269 A1* | 11/2020 | Lidman | H04L 63/10 |
| 2021/0016431 A1* | 1/2021 | Kim | B25J 19/026 |
| 2021/0043186 A1* | 2/2021 | Nagano | G10L 15/063 |
| 2021/0043204 A1* | 2/2021 | Hwang | G10L 15/20 |
| 2022/0165253 A1 | 5/2022 | Sharifi et al. | |
| 2022/0375469 A1* | 11/2022 | Yang | G10L 13/027 |

FOREIGN PATENT DOCUMENTS

| | | |
|---|---|---|
| KR | 10-2013-0123945 A | 11/2013 |
| KR | 10-2018-0127100 A | 11/2018 |
| KR | 10-2019-0096856 A | 8/2019 |
| KR | 10-2019-0104490 A | 9/2019 |
| KR | 10-2020-0046262 A | 5/2020 |
| KR | 10-2209689 B1 | 1/2021 |
| KR | 10-2213177 B1 | 2/2021 |
| KR | 10-2021-0089347 A | 7/2021 |
| KR | 10-2321798 B1 | 11/2021 |

OTHER PUBLICATIONS

Written Opinion (PCT/ISA/237) dated Jul. 17, 2023 issued by the ISA for International Application No. PCT/KR2023/005199.

José Novoa et al., "DNN-HMM based Automatic Speech Recognition for HRI Scenarios", HRI '18: Proceedings of the 2018 ACM/IEEE International Conference on Human-Robot Interaction, Feb. 2018, pp. 150-159, DOI: 10.1145/3171221.3171280, XP058387213.

José Novoa et al., "Automatic Speech Recognition for Indoor HRI Scenarios", ACM Transactions on Human-Robot Interaction (THRI), Mar. 2021, vol. 10, No. 2, Article No. 17, pp. 1-30, DOI: 10.1145/3442629, XP058493826.

Communication issued on Jun. 12, 2025 from the European Patent Office for European Patent Application No. 23843125.8.

* cited by examiner

ROBOT FOR ACQUIRING LEARNING DATA AND METHOD FOR CONTROLLING THEREOF

CROSS-REFERENCE TO RELATED APPLICATION(S)

This application is a continuation of PCT/KR2023/005199, filed on Apr. 18, 2023, at the Korean Intellectual Property Receiving Office and claims priority under 35 U.S.C. § 119 to Korean Patent Application No. 10-2022-0088584, filed on Jul. 18, 2022, in the Korean Patent Office, the disclosures of all of which are incorporated by reference herein in their entireties.

BACKGROUND

1. Field

The disclosure relates to a robot for acquiring learning data and a method for controlling thereof and, more particularly to, a robot capable of actively acquiring learning data for learning a speech recognition model and a method for controlling thereof.

2. Description of Related Art

Various services are provided by recognizing a user speech recently. In particular, it is important to increase the performance of a speech recognition model to more accurately recognize the user speech. In order to increase the performance of speech recognition, various methods for upscaling learning data have been proposed. For example, virtual learning data is generated by utilizing various noise along with reverberation and user characteristics learned based on a plurality of large-capacity databases to upscale the learning data.

However, the actual user environment has different environmental characteristics due to the user's residence type and the use space characteristics, and it is frequent that the environments are very different from the learned conditions due to the user's speech tendency and gender, surrounding environmental noise, dynamic user environment, and the like.

SUMMARY

Provided herein is a robot for acquiring learning data, including: a speaker; a microphone; a driver; a communication interface; a memory storing at least one instruction; and at least one processor connected to the speaker, the microphone, the driver, the communication interface, and the memory for controlling the robot, wherein the at least one processor, by executing the at least one instruction, is configured to: control the communication interface so that the robot transmits a command to an external device around the robot based on pre-stored environment information while the robot is operating in a learning mode, output first user speech for learning while the external device, responsive to the command, is outputting a noise, and learn a speech recognition model based on the noise and the first user speech for learning acquired through the microphone.

Also provided herein is a method of controlling a robot for acquiring learning data, the method including: transmitting a command to an external device around the robot based on pre-stored environment information while the robot is operating in a learning mode; outputting first user speech for learning while the external device, responsive to the command, is outputting a noise; and learning a speech recognition model based on the noise and the first user speech for learning acquired through a microphone provided in the robot.

Also provided herein is a non-transitory computer readable medium storing a program to execute a control method of a robot, the control method including: transmitting a command to an external device around the robot based on pre-stored environment information while the robot is operating in a learning mode; outputting first user speech for learning while the external device, responsive to the command, is outputting noise; and learning a speech recognition model based on the noise and the first user speech for learning acquired through a microphone provided in the robot.

DETAILED DESCRIPTION

Figure 1:
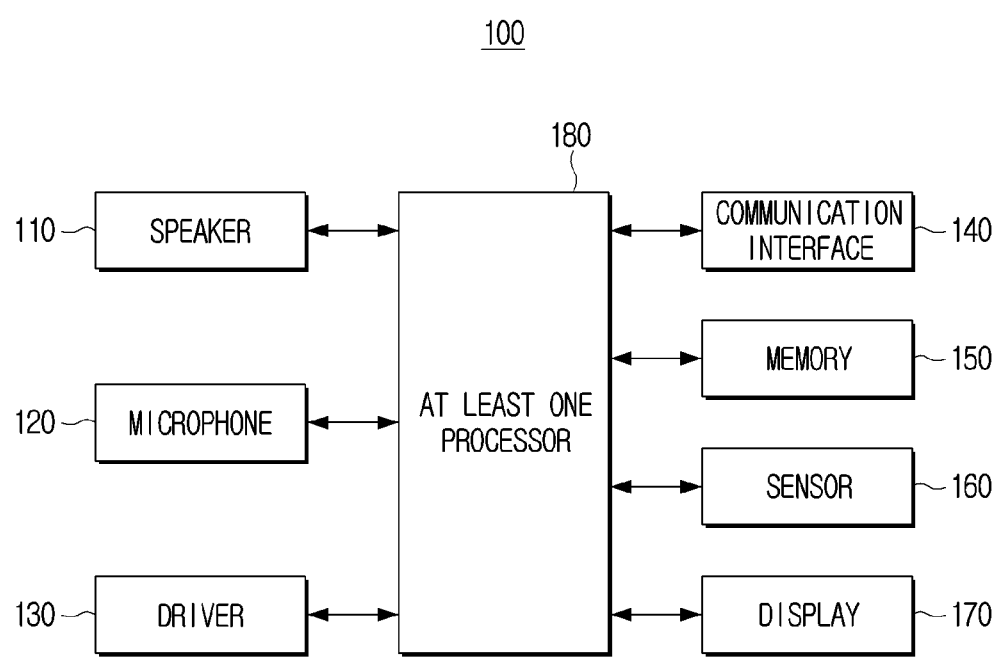
FIG. 1 is a block diagram illustrating a configuration of a robot according to an embodiment of the disclosure.

Embodiments of the disclosure have been described with reference to the accompanying drawings. However, this disclosure is not intended to limit the embodiments described herein but includes various modifications, equivalents, and/or alternatives. In the context of the description of the drawings, like reference numerals may be used for similar components.

In this document, the expressions "have," "may have," "including," or "may include" may be used to denote the presence of a feature (e.g., a component, such as a numerical value, a function, an operation, a part, or the like), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components. For example, a first user device and a second user device may indicate different user devices regardless of a sequence or importance thereof. For example, the first component may be named the second component and the second component may also be similarly named the first component, without departing from the scope of the disclosure.

The term such as "module," "unit," "part", and so on may be used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of." The expression "configured to" does not necessarily mean "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

Terms used in the disclosure may be used to describe specific embodiments rather than restricting the scope of other embodiments. Singular forms are intended to include plural forms unless the context clearly indicates otherwise. Terms used in the disclosure including technical and scientific terms may have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even where they may be defined in the disclosure.

Hereinbelow, the disclosure will be described in detail with reference to drawings. In describing the disclosure, detailed descriptions of related art techniques are omitted when it is determined that the disclosure may unnecessarily obscure the gist of the disclosure. In addition, the description of the same configuration of the disclosure will be omitted.

A robot 100 of the disclosure may operate in a speech recognition mode and a learning mode (or learning data collection mode). The speech recognition mode is a mode in which a configuration for speech recognition is activated, the collected user speech is recognized to perform a function corresponding to the user speech, and the learning mode is a mode in which various noise environments are generated at home when a user is absent, and the user speech or learning outputted from the generated noise environment is collected as learning data. In addition, the robot 100 may operate in a standby mode in which at least a part of the configuration related to speech recognition or learning data collection is deactivated in addition to the speech recognition mode and the learning data mode.

Figure 9A:
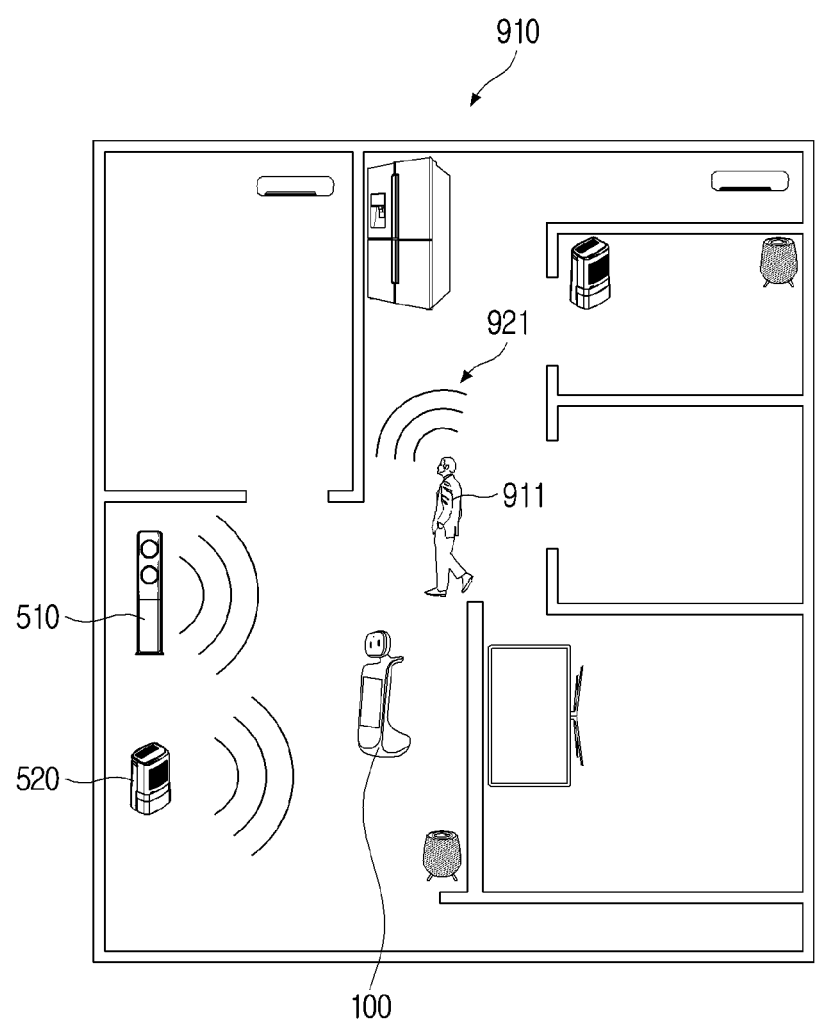
FIG. 9A is a diagram illustrating outputting user speech by a human.

When a user speech is uttered during a speech recognition mode, the robot 100 may acquire text information by recognizing a user speech. An example of a user talking or uttering user speech is shown in FIG. 9A. At this time, the robot 100 may acquire information on the characteristics of the user speech and environment information about the surrounding environment when acquiring the user speech. The robot 100 may store environment information, and may generate or train a text-to-speech (TTS) model based on information about characteristics of the user speech.

The robot 100 may operate in a learning mode when a preset condition (for example, a condition for detecting a member of a user, etc.) is detected. The robot 100 may generate a noise environment based on pre-stored environment information while operating in a learning mode, and output a user speech for learning in the noise environment by using the TTS model. The user speech for learning is an example of machine-generated user speech, which may also be referred to as machine user speech. The robot 100 may collect the outputted user speech for learning and noise as learning data so as to train an artificial intelligence model for speech recognition (hereinafter, referred to as a "speech recognition model").

Hereinafter, the disclosure will be described in detail with reference to drawings.

FIG. 1 is a block diagram illustrating a configuration of a robot according to an embodiment of the disclosure. As shown in FIG. 1, the robot 100 may include a speaker 110, the microphone 120, a driver 130, a communication interface 140, a memory 150, a sensor 160, a display 170, and at least one processor 180. A configuration obvious to those skilled in the art may be added. According to an embodiment of the disclosure, the robot 100 may be a robot providing various services at home, but this is merely an embodiment, and may be various types of service robots (for example, a serving robot). In addition, the configuration of the robot 100 is not limited to the configuration shown in FIG. 1, and a configuration obvious to those skilled in the art may be added.

The speaker 110 may output various speech messages. For example, the speaker 110 may output a speech message corresponding to a sentence for introducing the robot 100 ("Hello, I am a Samsung Bot"). In addition, the speaker 110 may output a speech message as a response message to the user speech.

In particular, the speaker 110 may utter a user speech for learning. Specifically, the speaker 110 may output a user speech for learning, which is generated by using a TTS model learned (or generated) based on a user speech.

The microphone 120 may acquire the speech of the user. The speech of the user may be referred to as acquired user speech, user speech, human-generated user speech or human user speech.

The at least one processor 180 may determine a task to be performed by the robot 100 based on a user speech acquired through the microphone 120. For example, when a user speech (for example, "do you have a schedule today?") requesting a schedule of a user through the microphone 120 is acquired, at least one processor 180 may control the robot 100 to provide various actions and response messages for performing a schedule description task.

The microphone 120 may acquire an audio signal including the user speech for learning and noise by learning data for learning the speech recognition model during operation as a learning mode.

The driver 130 is configured to perform various actions of the robot 100 in order to perform a task corresponding to the user interaction. For example, the driver 130 may include wheels for moving (or driving) the robot 100 and a wheel driving motor for rotating the wheels. Alternatively, the driver 130 may include a motor for moving head, arms, or hands of the robot 100. The driver 130 may include a motor driving circuit for supplying a driving current to various motors; and a rotation detection sensor for detecting the rotational displacement and the rotational speed of the motor. In addition, the driver 130 may include various configurations for controlling a facial expression, a gaze, and the like (for example, a light-emitting unit for outputting light for indicating the face or the facial expression of the robot 100).

The communication interface 140 may include at least one circuitry and may communicate with various types of external devices or servers. The communication interface 140 may include at least one of Bluetooth low energy (BLE) module, a Wi-Fi communication module, a cellular communication module, $3^{rd}$ generation (3G) mobile communication module, $4^{th}$ generation (4G) communication module, or $5^{th}$ generation (5G) mobile communication module.

In particular, the communication interface 140 may acquire information about the current external device (for example, information on a driving state of the external device, information on content outputted by the external device, etc.) from the external device in order to acquire the environment information while operating in the speech recognition mode. In addition, the communication interface 140 may transmit a control command generated based on the environment information to the external device while operating in the learning mode. In addition, the communication interface 140 may transfer the learned speech recognition model to an external device.

Figure 2:
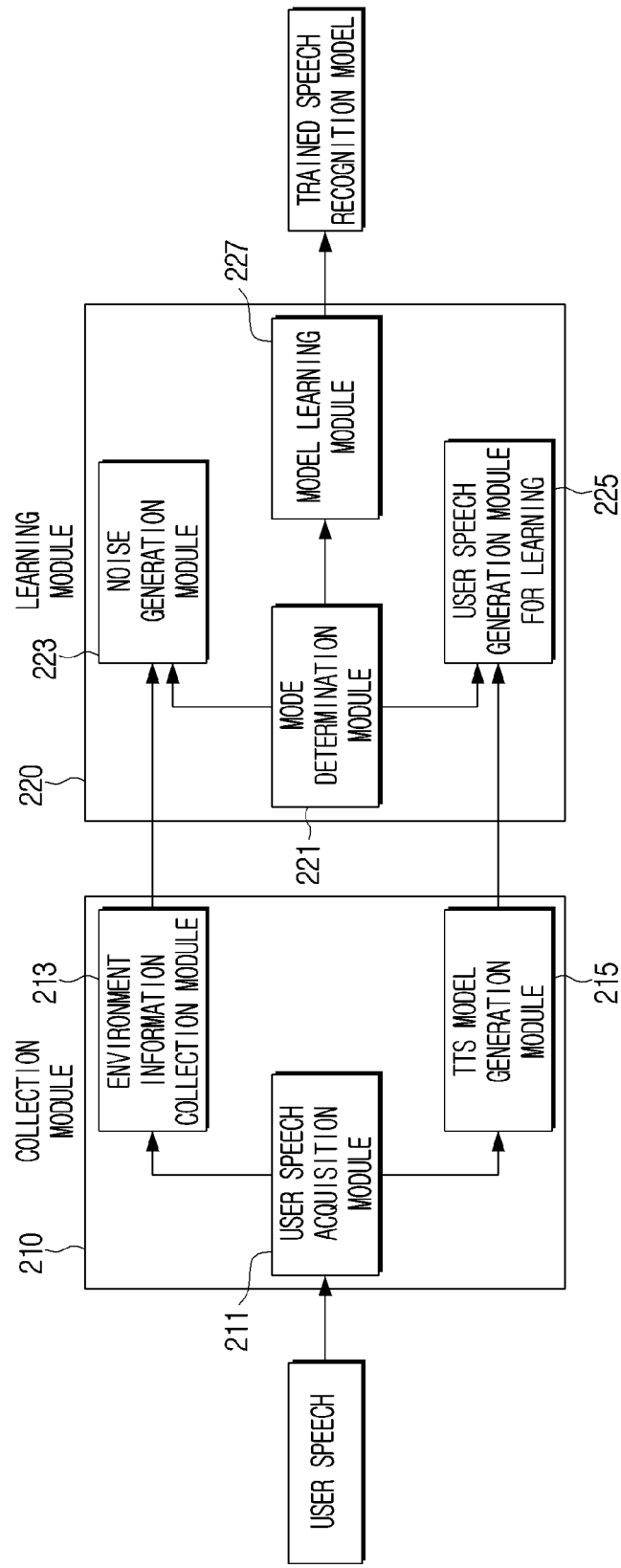
FIG. 2 is a block diagram illustrating a configuration to learn a speech recognition model of a robot according to an embodiment of the disclosure.

The memory 150 may store an operating system (OS) for controlling the overall operation of the components of the robot 100 and instructions or data related to the components of the robot 100. In particular, the memory 150 may include a collection module 210 for collecting data during a speech recognition mode and a learning module 220 for collecting learning data during a learning mode and learning the speech recognition model. In particular, as shown in FIG. 2, the collection module 210 may include a user speech acquisition module 211, an environment information collection module 213, and a TTS model generation module 215, and the learning module 223 may include a mode determination module 221, a noise generation module 223, a user speech generation module for learning 225, and a model learning module 227. In addition, the robot 100 may further include a speech recognition module, a natural language understanding module, a dialogue manager module, a natural language generation module, a TTS module, and the like to acquire a user speech and provide various services.

The memory 150 may be implemented as a non-volatile memory (ex: a hard disk drive (HDD) or solid state drive (SSD), a flash memory), a volatile memory (a memory inside the at least one processor 180), or the like.

The sensor 160 is configured to sense an environment around the robot 100 or a state of a user. According to an embodiment, the sensor 160 may include a camera, a depth sensor, and an inertial measurement unit (IMU) sensor. The camera is configured to acquire an image acquired by capturing the surroundings of the robot 100. The at least one processor 180 may recognize a user by analyzing a captured image acquired through a camera. For example, at least one processor 180 may recognize a user included in a captured image by inputting a captured image to an object recognition model. Here, the object recognition model is an artificial neural network model trained to recognize an object included in an image, and may be stored in the memory 110. Meanwhile, the camera may include various types of image sensors. The depth sensor is configured to sense an obstacle around the robot 100. The at least one processor 180 may acquire a distance from the robot 100 to an obstacle based on a sensing value of the depth sensor. For example, the depth sensor may include a LiDAR sensor. The depth sensor may include a radar sensor and a depth camera. The IMU sensor is configured to acquire posture information of the robot 100. The IMU sensor may include a gyro sensor and a geomagnetic sensor. In addition, the robot 100 may include various sensors for sensing an environment around the robot 100 or a state of the user.

The display 170 may display various information. In particular, the display 170 may visually display a response message to the user speech. In addition, the display 170 may display various information such as alarm information, or the like.

The at least one processor 180 is electrically connected to the memory 150 to control the overall function and operation of the robot 100. When the robot 100 is driven, the processor 170 may load data for performing various operations, such as modules 211 to 215 included in the collection module 210 and modules 221 to 227 included in the learning module 220, to the volatile memory when the robot 100 is driven. Here, the loading refers to an operation of loading and storing data stored in a nonvolatile memory in a volatile memory so that at least one processor 180 may access the data.

In particular, at least one processor 180 controls the communication interface 140 to transmit a command for controlling to output noise to an external device around the robot based on pre-stored environment information while the robot 100 operates in a learning mode. The at least one processor 180 outputs the user speech for learning while the external device outputs noise by the command. The at least one processor 180 learns a speech recognition model based on the noise and the user speech for learning acquired through the microphone 120.

Also, at least one processor 180 may acquire a user speech uttered by a user, acquire environment information including information on ambient noise and information on the robot 100 at the time when the user speech is acquired, and store the environment information in the memory 150 while the robot 100 operates in a speech recognition mode.

The pre-stored environment information further includes information on a place where the user speech is uttered, and the at least one processor 180 may determine a device to output the user speech for learning based on the place where the user speech is uttered. Specifically, when the place where the user speech is uttered and the place where the robot 100 is located is the same place when the user speech is acquired, the at least one processor 180 may determine so that the robot outputs the learning user speech, and when the place where the user speech is uttered and the place where the robot 100 is located is different from each other, the at least one processor 180 may determine that the external device located in the place where the user speech is uttered is outputted by the external device.

Also, at least one processor 180 may generate (or learn) a TTS model based on the acquired user speech, and generate a user speech for learning based on the generated (or learned) TTS model. In addition, at least one processor 180 may generate a user speech for learning by inputting at least one of a predefined text and a text frequently used by the user into a generated TTS model.

In addition, the environment information may include movement information of the robot when acquiring the user speech. The at least one processor 180 may control the driver 130 to drive the robot based on the movement information of the robot while the external device outputs the noise by the command.

In addition, the at least one processor 180 may determine the output start timing and end timing of the user speech for learning as the start timing and end timing of the speech recognition section of the robot 100.

When a preset event is detected, the at least one processor 180 may operate the robot 100 in a learning mode. Here, the preset event may be one of an event entering a time zone set by a user, an event entering a time zone in which the learning data is acquired in the past, and an event in which the user is detected as being outside.

In addition, at least one processor 180 may control the communication interface 140 to transmit the trained speech recognition model to an external device capable of speech recognition.

A method by which an electronic device learns a speech recognition model is described in more detail with reference to FIG. 2. FIG. 2 is a block diagram illustrating a configuration for training a speech recognition model of a robot according to an embodiment of the disclosure. The robot 100 may include a collection module 210 for collecting environment information and feature information on a user speech; and a learning module 220 for learning a speech recognition model by collecting learning data. The collection module 210 may include a user speech acquisition module 211, an environment information collection module 213, and a TS model generation module 215. The learning module 220 may include a mode determination module 221, a noise generation module 223, a user speech generation module for learning 225, and a model learning module 227.

The user speech acquisition module 211 may acquire a user speech during a speech recognition mode. Here, the user speech acquisition module 211 may acquire an audio signal including not only a user speech, but also various noise received from various external devices. In addition, the user speech acquisition module 211 may acquire a user speech through signal processing (beamforming or noise suppression) for the audio signal. The user speech acquisition module 211 may acquire characteristic information on the acquired user speech. The characteristic information of the user speech may include gender, age, and voiceprint of the user, but is not limited thereto. In addition, the user speech acquisition module 211 may detect and extract a speech section including a user speech among the acquired audio signals, and output the extracted speech section to a configuration (for example, a speech recognition model) for speech recognition. A speech section is data representing a speech utterance over a time interval.

The user speech acquisition module 211 may acquire characteristic information on the user speech when acquiring the user speech, but this is merely an embodiment, and the characteristic information may be acquired only when the user agrees to collect utterance characteristics.

The environment information collection module 213 may acquire environment information at the time when the user speech is acquired when the user speech is acquired during the speech recognition mode. The environment information may include information about a surrounding noise and information about the robot 100 at a time when the user speech is acquired.

To be specific, the environment information collection module 213 may record and store ambient noise at the time when a user speech is acquired. Alternatively, the environment information collection module 213 may transmit a signal for requesting information on an external device to the external device at the time when the user speech is acquired, and may receive information about the current external device (for example, information on a driving state of the external device, information on content outputted by the external device, etc.) from the external device and acquire environment information.

The environment information collection module 213 may acquire information about the robot 100 such as the location information of the robot 100 at the time when the user speech is acquired, the posture information of the robot 100, the moving information of the robot 100 (moving direction, moving speed, etc.).

The environment information collection module 213 may acquire location information of the user at the time when the user speech is acquired. The environment information collection module 213 may acquire location information of the user based on information on the location of the user terminal possessed by the user or information acquired from a plurality of sensors (for example, cameras, etc.) located at home.

The environment information collection module 213 may collect environment information whenever a user speech is acquired, but this is merely an embodiment, and when the misrecognition of the user speech is repeated more than a predetermined number of times, the environment information collection module 213 may collect environment information.

The US model generation module 215 may generate a TTS model based on the acquired user speech. The US model is a model that changes a text into a speech form and outputs the text to a speaker, and may be generated based on a characteristic of the acquired user speech. Specifically, the US model generation module 215 may generate a US model based on characteristic information (for example, gender, age, standard language use, etc.) of the user speech acquired by the user speech acquisition module 211. For example, when the gender of the user is left based on the characteristic information of the user's speech and the age is identified as the middle age, the US model generation module 215 may generate a US model based on the speech of the middle-aged man. At this time, the US model generation module 215 may generate a US model by itself, but this is merely an embodiment, and a TS model based on characteristic information of a user speech may be received from an external server, and the pre-stored US model may be trained based on characteristic information of the user speech. The US model generation module 215 may generate a US model that may generate the same speech as the user speech based on the voiceprint of the user speech.

The US generation module 215 may store the generated US model in the memory 150, but this is merely exemplary, and the generated US model may be transmitted to an external device.

The mode determination module 221 may determine the mode of the robot 100 according to the surrounding environment. Specifically, the mode determination module 221 may determine to operate in a learning mode when a preset event is detected. The preset event may be one of an event entering a time zone set by a user, an event entering a time zone in which the learning data is acquired in the past, and an event in which a user is sensed to go outside. For example, when an event entering 1 PM which is a time period set by a user is detected, the mode determination module 221 may determine to operate in a learning mode. In addition, when an event entering 3 PM which is a time zone in which learning data is acquired (for example, three times) or more in the past (or a time zone of entering the learning mode) is acquired, the mode determination module 221 may determine to operate in the learning mode. In addition, when an event without a user is detected at home based on a sensing value acquired through the sensor 160 or sensing information acquired from another external device, the mode determination module 221 may determine to operate in a learning mode. In addition, when it is detected that the current user is going out, travelling, or going to work from the user terminal, the mode determination module 221 may determine to operate in the learning mode. In addition, when entering a time zone (for example, night or dawn) that does not use the robot 100 on the user pattern, the mode determination module 221 may determine to operate in the learning mode.

The mode determination module 221 may determine that a speech recognition mode is operated when a preset trigger speech (e.g., hi, Bixby, etc.) or a preset button is selected.

The mode determination module 221 may determine that a standby mode is operated when the speech recognition mode and the learning mode are not operated. During the standby mode, a configuration, or the like to acquire a preset trigger speech may be activated, and remaining some configurations (e.g., speaker, etc.) may be inactivated.

The noise generation module 223 may generate noise based on pre-stored environment information in order to reproduce an environment when acquiring a user speech during a learning mode. The noise generation module 223 may generate noise by reproducing pre-recorded data. In addition, the noise generation module 223 may generate a command for controlling the external device based on the information about the external device at the time when the user speech is acquired, and transmit the generated command to the external device. For example, when the air conditioner operates in the first mode at the time when the user speech is acquired, and the environment information for reproducing the first content by the TV is stored, the noise generation module 223 may transmit, to the air conditioner, a first command for operating the air conditioner in the first mode during the learning mode, and may transmit a second command to reproduce the first content to the TV. The command may further include information on an operation mode of the external device, information on the reproduction content, information on an audio volume, information on a reproduction time of the content, information on an operation time, and the like.

The noise generation module 223 may control an external device for noise generation, but this is merely an embodiment, and the operation of the robot 100 may be controlled. For example, the noise generation module 223 may control the driver 130 in order to generate driving noise generated by the robot 100 at the time when the user speech is acquired based on the environment information. The noise generation module 223 may control the speaker 110 to reproduce a response message or content reproduced by the robot 100 at the time when the user speech is acquired.

The user speech generation module for learning 225 may generate the learning user speech based on the TTS model generated by the TTS model generation module 215.

In particular, the user speech generation module for learning 225 for learning may determine a device to output a user speech for learning based on a place where a user speech is uttered when acquiring a user speech. Specifically, when the place where the user speech is uttered and the place where the robot 100 is located is the same place when the user speech is acquired, the user speech generation module for learning 225 may determine so that the robot 100 outputs the learning user speech. When a place where the user speech is uttered and a place where the robot 100 is located is different from each other when the user speech is acquired, the user speech generation module for learning 225 may determine an external device located at a place where the user speech is uttered to output the speech for learning. For example, if the place where the user speech is uttered and the place where the robot 100 is located is a living room when acquiring the user speech, the user speech generation module for learning 225 may determine to output the learning user speech by the robot 100 located in the living room. However, when the place where the user speech is uttered is not in the room and the place where the robot 100 is located is a living room when the user speech is acquired, the user speech generation module for learning 225 may determine that the TV located in the room outputs the user speech for learning.

When the robot 100 is determined to output a user speech for learning, the user speech generation module for learning 225 may generate a learning user speech by using a pre-generated US model. When the external device is determined to output the user speech for learning, the user speech generation module for learning 225 may transmit information on the user speech generated by using the pre-generated US model to the external device. Alternatively, the user speech generation module for learning 225 may transmit a command for generating the learning user speech to an external device storing the TTS model.

Also, the user speech generation module for learning 225 may generate a user speech for learning by inputting at least one of a predefined text and a text frequently used by the user into a generated US model. Specifically, the user speech generation module for learning 225 may generate a user speech for learning by using text (in particular, a sentence that may include various utterance characteristics) pre-stored in the memory 150.

Also, the user speech generation module for learning 225 may generate a user speech for learning by inputting at least one of text used more than a predetermined number of times into a TS model. The user speech generation module for learning 225 may generate a user speech for learning by inputting a text mainly used for each location at home (a text uttered by a preset number of times or more) into a TTS model. For example, when the location of the robot 100 is kitchen, the user speech generation module for learning 225 may generate "please let me know recipe notification,"

which is a sentence frequently used in the kitchen, as a user speech for learning, and when the location of the robot 100 is a living room, the user speech generation module for learning 225 may generate "Please turn on TV" which is a frequently used sentence in the living room as a user speech for learning.

In addition, the user speech generation module for learning 225 may determine a text to be input to a US model based on an operation change of an external device after a speech recognition failure. Specifically, the user speech generation module for learning 225 may identify an operation change of the external device after speech recognition failure for the user speech collected during the speech recognition mode. For example, when the user speech uttered during the speech recognition mode is "Please lower the air conditioner temperature" or when the robot 100 does not recognize the same, the user may use the remote controller to lower the temperature of the air conditioner. At this time, the user speech generation module for learning 225 may identify an operation change (lower set temperature of an air conditioner) of the external device after speech recognition failure for the user speech collected during the speech recognition mode, and may determine a text such as "Please lower the temperature" as a text to be input to the TTS model.

The model learning module 227 may learn a speech recognition model using noise and learning user speech acquired through the microphone 120 during a learning mode as learning data. The speech recognition model is a model for inputting a speech signal to acquire text-type data, and may include at least one of an acoustic model and a language model.

In particular, in order to acquire learning data of an accurate speech recognition section, the model learning module 227 may determine an output start time point and an end time point of a learning user speech as a start time point and an end time point of a speech recognition section of the robot 100.

The model learning module 227 may not only learn the speech recognition model, but also transmit information about the learned speech recognition model to the external device. That is, the model learning module 227 may transmit information on a speech recognition model learned to an external device capable of recognizing a user speech. Accordingly, speech recognition performance of other external devices used by a user at home as well as the robot 100 may be improved.

Figure 3:
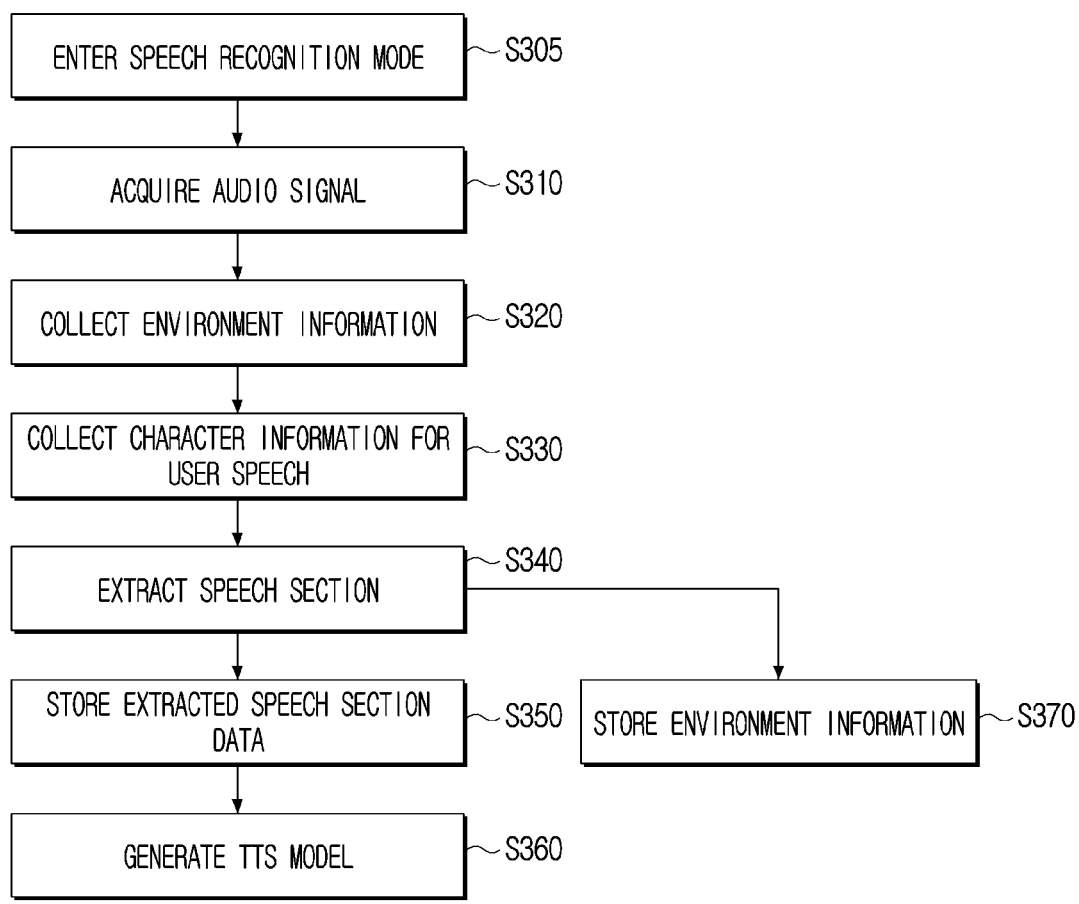
FIG. 3 is a flowchart illustrating a method of collecting environment information and information about utterance characteristic while operating in a speech recognition mode according to an embodiment of the disclosure.

FIG. 3 is a flowchart illustrating a method of collecting environment information and information about utterance characteristic while operating in a speech recognition mode according to an embodiment of the disclosure.

The robot 100 may enter a speech recognition mode in operation S305. Specifically, when a preset trigger speech is received or a preset button provided in a robot or an external device connected to a robot is selected, the operation mode of the robot 100 may enter into a speech recognition mode.

During the speech recognition mode, the robot 100 may acquire an audio signal in operation S310. Here, the robot 100 may acquire an audio signal through at least one microphone located in the robot 100 or a microphone connected to the robot 100. The audio signal may include not only a user's speech, but also noise generated from the outside.

The robot 100 may collect environment information while an audio signal is acquired in operation S320. The environment information may include information about a surrounding noise at a time when the user speech is acquired, information about the robot 100, information on a place where the user speech is uttered, and the like, but is not limited thereto.

The robot 100 may collect characteristic information about the user speech in operation S330. The robot may acquire characteristic information (for example, gender, age, standard language use, etc.) for the user speech by analyzing the user speech included in the audio signal.

The robot 100 may extract a speech section from an audio signal in operation S340. The robot 100 may extract a speech section including a user speech by analyzing the audio signal. The robot 100 may remove a noise component included in the audio signal, extract a predetermined speech detection parameter from the audio signal from which the noise component is removed, and compare the extracted predetermined speech detection parameter value with a threshold to determine a speech and a non-speech period. However, this is merely an embodiment, and a speech section may be extracted by another method.

The robot 100 may store extracted speech section data in operation S350. The robot 100 may store speech section data for a user speech.

The robot 100 may generate a TTS model in operation S360. Specifically, the robot 100 may generate a TTS model based on the speech section data so as to utter with a speech similar to a user. In addition, the robot 100 may generate a TTS model based on characteristic information about the user speech. In addition, the robot 100 may train a pre-stored TTS model based on speech section data or characteristic information. In addition, the robot 100 may receive a TTS model capable of outputting a speech similar to a user speech from an external server based on speech section data or characteristic information.

In addition, the robot 100 may store environment information after extracting a speech section in operation S370. The environment information may be matched with the speech section data and stored.

Figure 4:
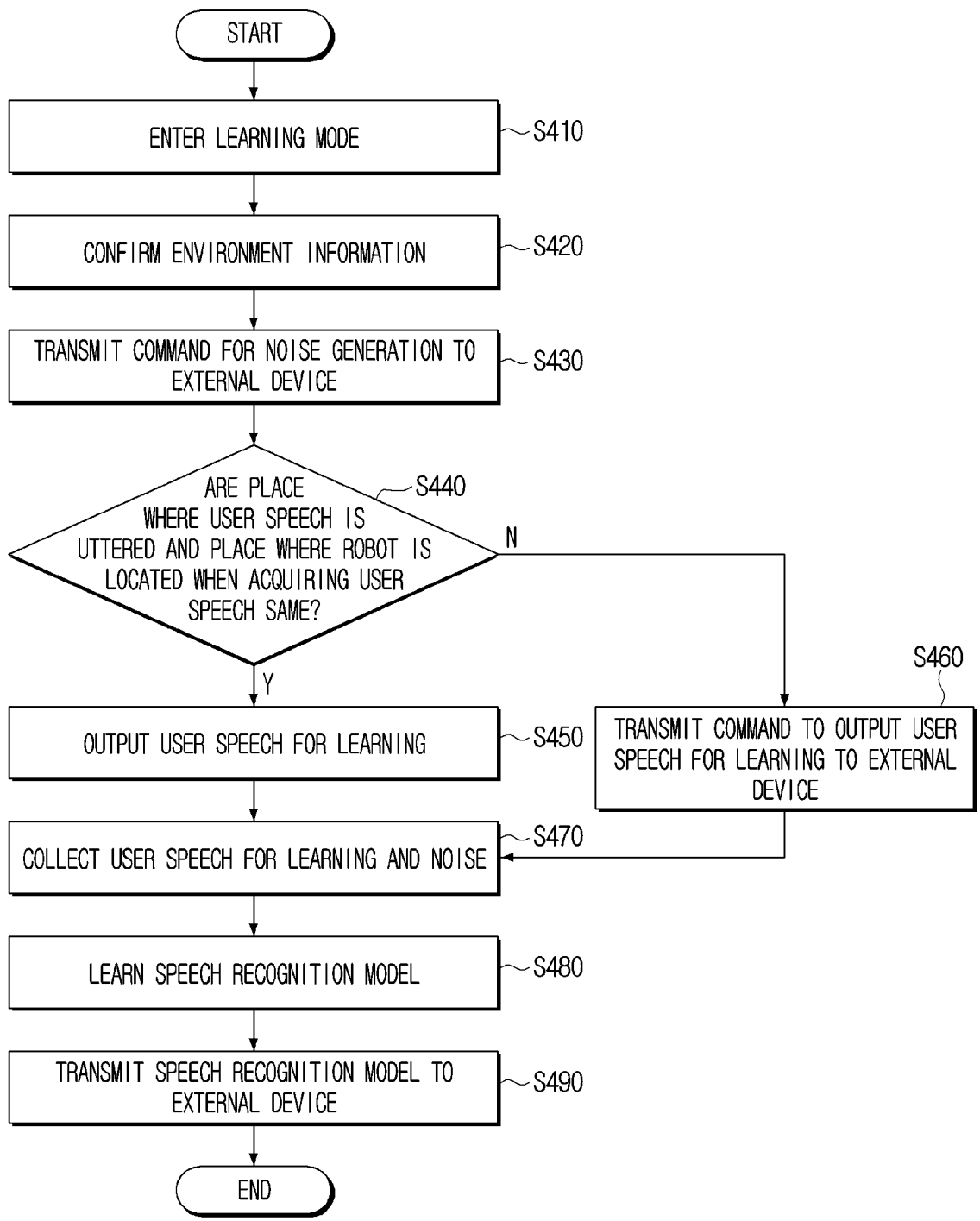
FIG. 4 is a flowchart illustrating a method of learning a speech recognition model by collecting learning data while operating in a learning mode according to an embodiment of the disclosure.

FIG. 4 is a flowchart illustrating a method of learning a speech recognition model by collecting learning data while operating in a learning mode according to an embodiment of the disclosure.

The robot 100 may enter a learning mode in operation S410. At this time, when a preset event is detected, the robot 100 may enter a learning mode. The preset event may be one of an event entering a time zone set by a user, an event entering a time zone in which the learning data is acquired in the past, and an event that a user is sensed as being outside.

The robot 100 may check the environment information in operation S420. The robot 100 may identify environment information acquired during a speech recognition mode. For example, the robot 100 may identify environment information including information about a surrounding noise at a time when the user speech is acquired, information about the robot 100, and location information of the user at a time when the user speech is acquired.

The robot 100 may transmit a command for noise generation to an external device in operation S430. Specifically, the robot 100 may identify a command corresponding to the identified environment information and transmit the identified command to an external device. However, when it is identified that no noise is generated through the environment information, the robot 100 may not transmit a command to the external device.

The robot 100 may identify whether a place where the robot 100 is located is the same place when acquiring a place where the user speech is uttered and the user speech in operation S440. The robot 100 may identify whether a place where the user speech is uttered and a place where the robot 100 is located is the same place when acquiring the user speech through the identified environment information.

When a place where the user speech is uttered is the same as a place where the robot 100 is located when acquiring the user speech in operation S440—Y, the robot 100 may output the user speech for learning in operation S450. The robot 100 may output user speech for learning by inputting a predefined text to the generated TTS model.

If the place where the user speech is uttered and the place where the robot 100 is located is different from each other when the user speech is acquired in operation S440—N, the robot 100 may transmit a command for outputting the user speech for learning to the external device in operation S460. Specifically, the robot 100 may identify an external device located in a place where the user speech is uttered, and transmit a command for outputting the user speech for learning to the identified external device. At this time, the command may include a command for generating the learning user speech by using the TTS model stored in the identified external device, but this is merely an embodiment, and information on the learning user speech generated by using the TTS model stored in the robot 100 may be included.

The robot 100 may collect learning user speech and noise in operation S470. The robot 100 may collect user speech and noise for learning through the microphone 120, as learning data.

The robot 100 may learn a speech recognition model in operation S480. Specifically, the robot 100 may learn a speech recognition model based on predefined text and collected learning user speech and noise.

The robot 100 may transmit a speech recognition model to an external device in operation S490. Specifically, the robot 100 may transmit a learned speech recognition model to an external device capable of performing a speech recognition function among various external devices located in the place where the user is located.

Figure 5:
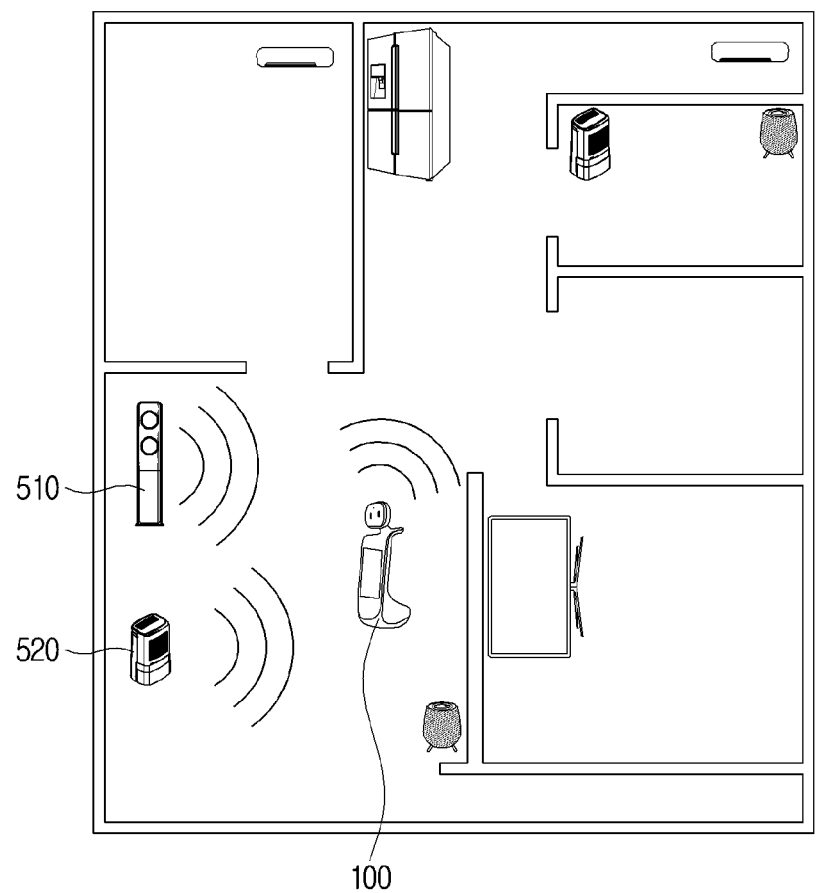
FIG. 5 is a diagram illustrating an embodiment of outputting user speech by a robot according to an embodiment of the disclosure.

FIG. 5 is a diagram illustrating an embodiment of outputting user speech by a robot according to an embodiment of the disclosure. First of all, the robot 100 illustrated in FIG. 5 and a plurality of external devices may be connected for communication.

The robot 100 may collect user speech during a speech recognition mode. At this time, the robot 100 may collect information on an operation of an external device, information on a mode, and information on an audio (or content) output by an external device, from at least one external device operating while collecting the user speech. The robot 100 may store, as environment information, information about an operation of an external device, information about a mode, and information about an audio (or content) output by an external device from at least one external device. For example, as shown in FIG. 5, the robot 100 may identify an air conditioner 510 and an air purifier 520 operating in the living room while collecting the user speech in the living room. Specifically, the robot 100 may transmit a signal for requesting information to an external device located at home while collecting the user speech, and may identify whether to operate based on a signal responding to the transmitted signal. The robot 100 may receive information about a current operation mode and information on a detailed configuration of an external device from the air conditioner 510 and the air purifier 520 located in the living room.

In particular, when speech recognition for a user speech fails or misrecognizes during a speech recognition mode, the robot 100 may collect information about an operation of an external device, information about a mode, and information on an audio (or content) output by at least one external device.

When the robot 100 detects a preset event, a learning mode may be entered.

When entering the learning mode, the robot 100 may control the driver 130 to move to the living room based on the pre-stored environment information, and may transmit a command for generating noise to the air conditioner 510 and the air purifier 520. The command for generating noise may be generated based on information on an operation mode of the air conditioner 510 and the air purifier 520 located in a living room included in pre-stored environment information, and information on a detailed configuration of an external device. For example, when the operation mode of the air conditioner 510 is in the cooling mode and the wind intensity is strong in the pre-stored environment information, and if the mode of the air purifier 520 is stored as an air purification mode, the robot 100 may transmit a command for operating the air conditioner 510 in the cooling mode of the wind intensity being strong and transmit a command for operating the air purifier 520 in the air purification mode. A quiet wind intensity may be imperceptible to a user, a medium wind intensity may be mildly perceptible to the user as a sound, and a strong wind intensity may be felt by the user by wind pressure on the face, hands or arms.

The robot 100 may store reproduced content, an operation pattern, a moving speed, and a traffic line of the robot 100 performed during the speech recognition mode as environment information. When entering the learning mode, the robot 100 may reproduce the reproduction content stored in the environment information and control the driver 130 to operate according to the operation pattern, the movement speed, and the traffic line stored in the environment information.

The robot 100 may output learning user speech including a predefined text. At this time, the robot 100 may output learning user speech by inputting a predefined text to a TTS model reflecting the feature information of the user speech.

The robot 100 may collect noise and learning user speech generated from the air conditioner 510 and the air purifier 520, and may learn the speech recognition model by using the collected noise and learning user speech as learning data. In this case, the robot 100 may determine an output start time point and an end time point of the learning user speech, which is an utterance section of the user speech for learning, as the start time point and the end time point of the speech recognition section of the robot 100.

In FIG. 5, when the place where the user speech is uttered and the place where the robot is located is the same place upon acquiring the user speech, the robot 100 outputs the user speech for learning, but this is merely an embodiment, and the external device located in the same space as the robot 100 may output the user speech for learning.

Figure 6:
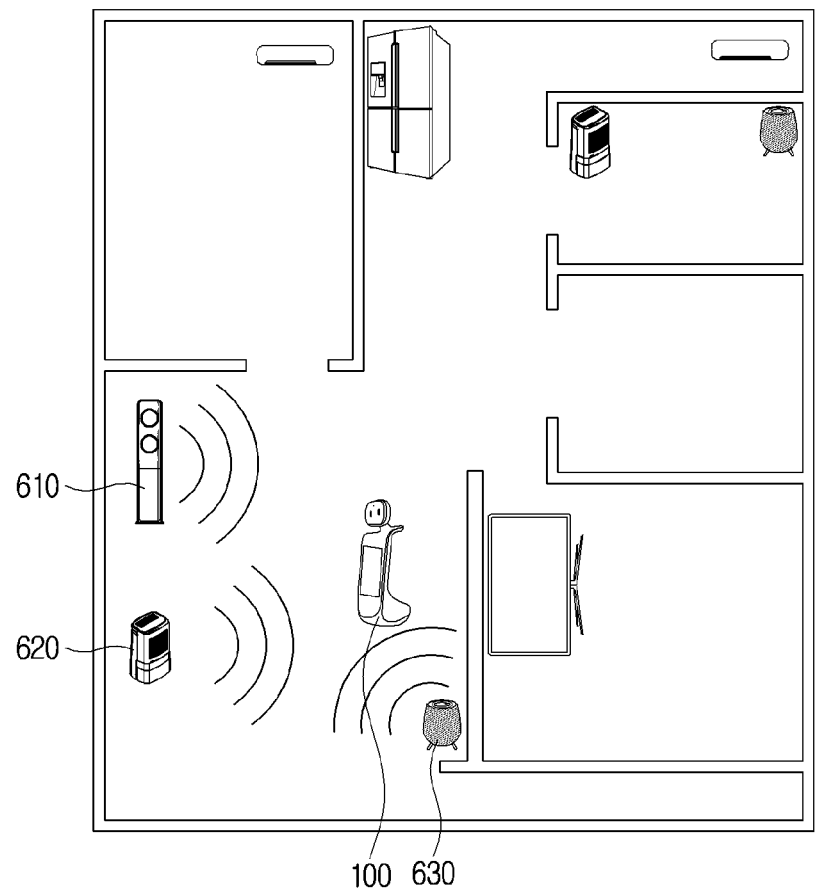
FIG. 6 is a diagram illustrating an embodiment of outputting user speech for learning by an external device located in a same place according to an embodiment of the disclosure.

FIG. 6 is a diagram illustrating an embodiment in which an external device located in the same space outputs a user speech for learning according to an embodiment of the disclosure. First, the robot 100 and the plurality of external devices shown in FIG. 6 may be communicatively connected to each other.

The description of collecting user speech and environment of FIG. 6 is the same as the description in FIG. 5, a duplicate description will be omitted.

When the robot 100 detects a preset event, a learning mode may be entered.

When entering the learning mode, the robot 100 may control the driver 130 to move to the living room based on pre-stored environment information, and may transmit a command for generating noise to an air conditioner 610 and an air purifier 620.

The robot 100 may control the driver 130 to operate according to an operation pattern and a traffic line stored in the environment information.

The robot 100 may transmit a command for outputting a user speech for learning including a predefined text to an AI speaker 630. At this time, the AI speaker 630 may output the learned user speech based on the transmitted command. Specifically, the AI speaker 630 may generate and output a user speech for learning by inputting a predefined text into a TTS model in which characteristic information of the user speech is reflected. Alternatively, the AI speaker 630 may output the user speech for learning based on the information about the user speech for learning, which is generated by the TTS model stored in the robot 100.

The robot 100 may collect the noise generated from the air conditioner 510 and the air purifier 520 and the user speech for learning output by the AI speaker 630, and may learn the speech recognition model by using the collected noise and user speech for learning as learning data.

In the meantime, although the external device outputs at least one of the noise and the user speech for learning in FIGS. 5 and 6, this is merely an embodiment, and when an external device does not exist or a communication connection with an external device is not performed, the robot 100 may output both the noise and the user speech for learning. Specifically, the robot 100 may generate noise audio based on a pre-recorded audio signal as environment information. The robot 100 may generate a user speech for learning by inputting a predefined text to a TTS model in which characteristic information of the user speech is reflected. The robot 100 may synthesize and output a noise audio signal and a user speech for learning. In addition, one of the external devices other than the robot 100 may generate and output a noise audio signal and a user speech for learning.

Figure 7:
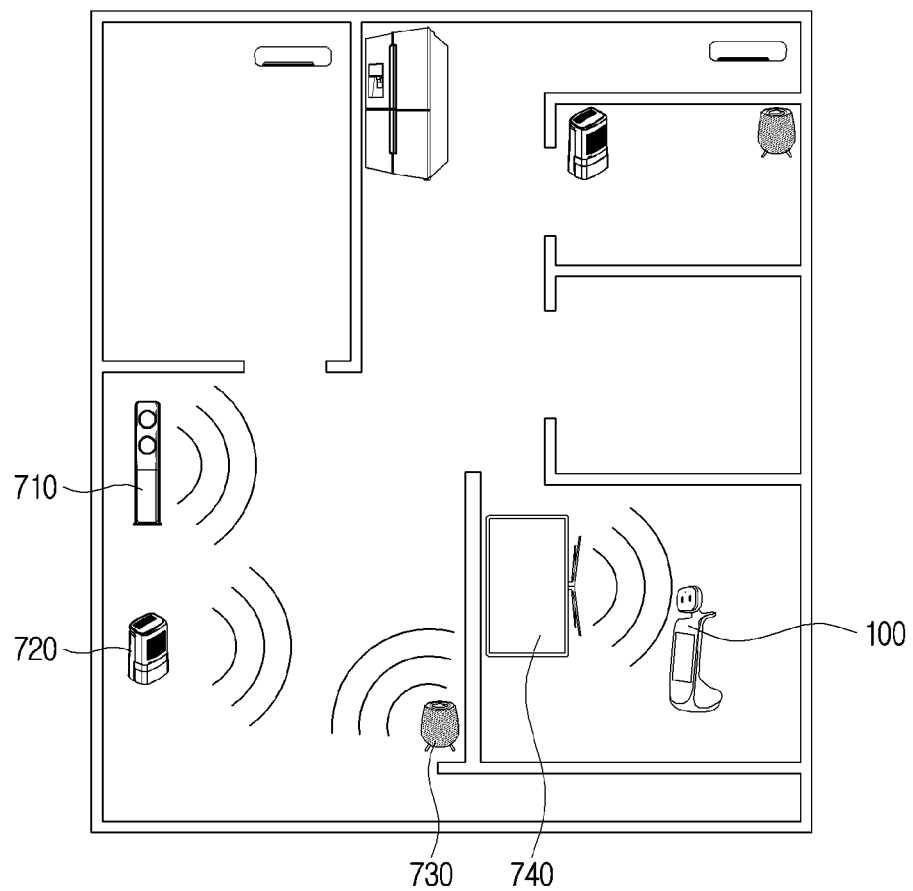
FIG. 7 is a diagram illustrating an embodiment of outputting user speech for learning by an external device located in a different place according to an embodiment of the disclosure.

FIG. 7 is a diagram illustrating an embodiment of outputting user speech for learning by an external device located in a different place according to an embodiment of the disclosure. The robot 100 illustrated in FIG. 7 and a plurality of external devices may be communicatively connected from each other.

The robot 100 may collect user speech during a speech recognition mode. At this time, the robot 100 may collect information on an operation of an external device, information on a mode, and information on an audio (or content) output by an external device, from at least one external device operating while collecting the user speech. The robot 100 may store, as environment information, information about an operation of an external device, information about a mode, and information about an audio (or content) output by an external device from at least one external device. For example, as shown in FIG. 7, the robot 100 may identify an air conditioner 710 and an air purifier 720 operating in a living room while collecting a user speech in a main room of a home, and a TV 740 operating in the main room. Specifically, the robot 100 may transmit a signal for requesting information to an external device located at home while collecting the user speech, and may identify whether to operate based on a signal responding to the transmitted signal. The robot 100 may receive, from the air conditioner 710 and the air purifier 720 located in the living room, information on the current operation mode, information on detailed settings of the external device, and information on the content currently being played, from the air conditioner 710 and the air purifier 720 located in the living room.

At this time, an utterance position of the user speech may be generated in a living room other than the main room in which the robot 100 is located, and an utterance position of the user speech may be identified by an external device located in the living room. In addition, the utterance location of the user speech may be stored as environment information.

When the robot 100 detects a preset event, a learning mode may be entered.

When entering the learning mode, the robot 100 may control the driver 130 to move to the main room based on pre-stored environment information, and may transmit a command for generating noise to the air conditioner 710, the air purifier 720, and a TV 740. At this time, the command for generating noise may be generated based on information on an operation mode of the air conditioner 710, the air purifier 720, and the TV 740 located in a living room included in pre-stored environment information, information on detailed settings, and information on content currently being played.

The robot 100 may transmit a command for outputting a learning user speech including predefined text to an AI speaker 730 located in a living room. That is, the robot 100 may identify the AI speaker 730, which is an external device located in the living room, based on an utterance position of the user speech stored in the environment information. In addition, the robot 100 may transmit a command for outputting the learning user speech including the predefined text to the AI speaker 730.

At this time, the AI speaker 730 may output the learned user speech based on the transmitted command. Specifically, the AI speaker 730 may generate and output a user speech for learning by inputting a predefined text into a TTS model in which characteristic information of the user speech is reflected. Alternatively, the AI speaker 730 may output the user speech for learning based on the information on the user speech for learning, which is generated by the TTS model stored in the robot 100.

The robot 100 may collect noise generated from the air conditioner 710, the air purifier 720, and the TV 740, and a user speech for learning output by the AI speaker 730, and may learn the speech recognition model by using the collected noise and user speech for learning as learning data.

As described above, in order to learn a speech recognition model, the robot 100 may reproduce an environment in which a user speech is collected during a speech recognition mode in order to learn a speech recognition model, thereby embodying the robot 100 to which a more personalized speech recognition function is applied by learning a speech recognition model.

Figure 8:
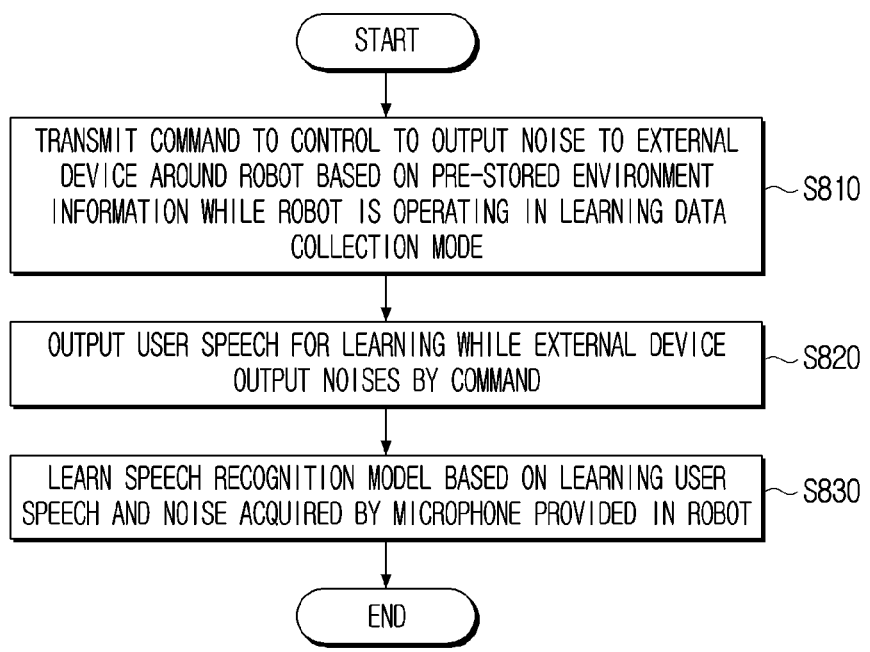
FIG. 8 is a flowchart illustrating a method of controlling a robot to collect learning data according to an embodiment of the disclosure.

FIG. 8 is a flowchart illustrating a method of controlling a robot to collect learning data according to an embodiment of the disclosure.

The robot 100 transmits a command to control to output noise to an external device around the robot 100 based on pre-stored environment information while the robot is operating in a learning mode in operation S810.

The robot 100 outputs the user speech for learning while the external device outputs the noise by the command in operation S820. Here, the user speech for learning may directly output by the robot 100, but this is merely an embodiment, and the speech may be output by an external device.

The robot 100 may learn the speech recognition model based on the learning user speech and noise acquired by the microphone provided in the robot 100 in operation S830.

FIG. 9A illustrates an scenario 910 including a human 921 who is an example of the user described above. FIG. 9A is similar to FIGS. 5, 6 and 7, with the addition of the human 921. Other description previous figures is not repeated here. The human 921 may utter speech 921 which is an example of the user speech acquired by the robot 100. Thus, in FIG. 9A, user speech is acquired when the user talks.

Figure 9B:
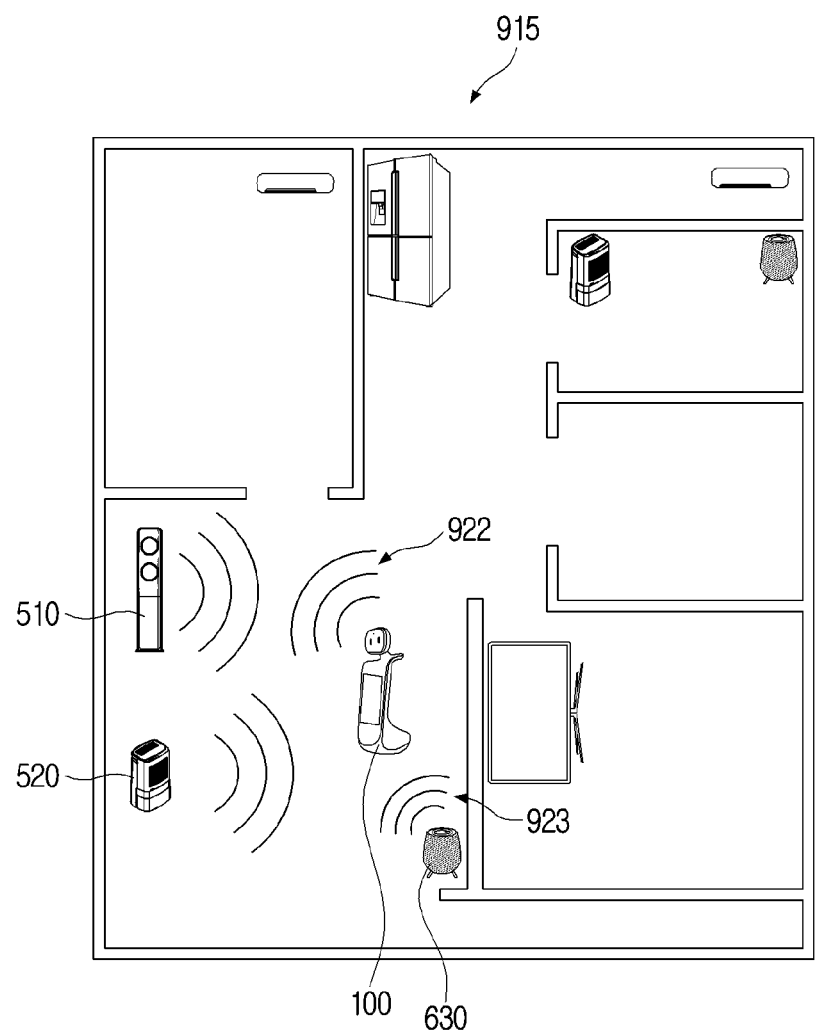
FIG. 9B is a diagram illustrating outputting user speech by a robot and/or by an external device.

FIG. 9B illustrates a scenario 915 in which the human 921 is not uttering user speech. The robot 100 may utter user speech 922 and/or an external device such as AI speaker 630 (or another external device) may utter user speech 923. User speech 922 and user speech 923 are examples of user speech for learning described above. Thus, in FIG. 9B, user speech for learning is uttered and a learning process to improve the speech model (for example, the TTS model) occurs.

In general, the robot 100 may acquire user speech uttered by a user while the robot 100 is operating in a speech recognition mode. The robot 100 may acquire environment information including information about ambient noise at a time when the user speech is acquired and information about the robot 100 and store the information.

The pre-stored environment information may further include information about a place where the user speech is uttered. The robot 100 may determine a device to output the user speech for leaning based on the place where the user speech is uttered. To be specific, based on a place where the user speech is uttered and a place where the robot is located when acquiring the user speech being same, the robot 100 may determine that the robot outputs the user speech for learning, and based on the place where the user speech is uttered and the place where the robot is located when acquiring the user speech being different, the robot 100 may determine that an external device located in a place where the user speech is uttered outputs the user speech for learning.

Further, the robot 100 may generate a text-to-speech (TrS) model based on the acquired user speech. In addition, the robot 100 may generate the user speech for learning based on the generated TTS model. At this time, the robot 100 may generate a user speech for learning by inputting at least one of a predefined text and a text frequently used by the user into the generated TTS model.

The environment information may include movement information of the robot when acquiring the user speech. The robot 100 may drive based on movement information of the robot 100 while the external device outputs noise by the command.

The robot 100 may determine an output start time point and an end time point of the user speech for learning as a start time point and an end time point of a speech recognition section of the robot.

Based on a preset event being detected, the robot 100 may enter a learning mode. The preset event may include at least one of an event of entering a time zone set by a user, an event of entering a time zone at which learning data was acquired in the past, and an event in which a user is detected as going outside.

In addition, the robot 100 may transmit the trained speech recognition model to an external device capable of speech recognition.

According to the disclosure as described above, the robot 100 may train a speech recognition model by reproducing an environment during a speech recognition mode, and thus the robot 100 to which a more personalized speech recognition function is applied may be embodied.

A function related to artificial intelligence according to the disclosure (for example, a learning function and an inference function for a neural network model) is operated through at least one processor and a memory of the robot.

The processor may be configured with one or a plurality of processors. The one or more processors may include at least one of a central processing unit (CPU), a graphic processing unit (GPU), and a neural processing unit (NPU), but is not limited to the above-described processor.

The CPU is a general-purpose processor capable of performing an artificial intelligence operation as well as a general operation, and may efficiently execute a complex program through a multi-layer cache structure. The CPU is advantageous in a serial processing method which enables organic connection between a previous calculation result and a next calculation result through sequential calculation. The general-purpose processor is not limited to the above-described example except for the aforementioned CPU.

The GPU is a processor for mass calculation, such as a floating point operation used for graphics processing, and may perform large-scale operations in parallel by integrating the cores in large quantities. In particular, the GPU may be advantageous in a parallel processing scheme such as a convolution operation as compared to a CPU. In addition, the GPU may be used as a co-processor for supplementing functions of the CPU. The processor for mass calculation is not limited to the above-described example except for the case of specifying the GPU described above.

NPU is a processor specialized for artificial intelligence calculation using an artificial neural network, and may implement each layer constituting the artificial neural network as hardware (for example, silicon). At this time, since the NPU is designed to be specialized according to a requirement specification of a company, the degree of freedom is lower than that of a CPU or a GPU, but an artificial intelligence operation for requesting a company may be efficiently processed. Meanwhile, a processor specialized for artificial intelligence calculation may be implemented in various forms such as a Tensor Processing Unit (TPU), an Intelligent Processing Unit (IPU), and a Vision Processing Unit (VPU). The artificial intelligence processor is not limited to the above-described example, except for a case where it is specified as the NPU described above.

The one or more processors may also be implemented in a System on Chip (SoC). The SoC may further include, in addition to the one or more processors, a network interface such as a bus for data communication between the processor and the memory.

When a plurality of processors are included in a system on chip (SoC) included in the robot 100, the robot 100 may perform an operation related to artificial intelligence (for example, an operation related to learning or inference of an artificial intelligence model) by using some of the plurality of processors. For example, the robot 100 may perform an operation related to artificial intelligence by using at least one of a GPU, an NPU, a VPU, a TPU, or a hardware accelerator specialized for an artificial intelligence operation such as a convolution operation, a matrix multiplication operation, and the like, among a plurality of processors. However, this is merely an embodiment, and an operation related to artificial intelligence may be processed by using a CPU and a general-purpose processor.

Also, the robot 100 may perform an operation on a function related to artificial intelligence by using a multi-core (e.g., a dual core, a quad core, etc.) included in one processor. In particular, the robot 100 may perform an artificial intelligence operation such as a convolution operation and a matrix multiplication operation in parallel using a multi-core included in the processor.

The one or more processors control the processing of the input data according to a predefined operating rule or AI model stored in the memory. The predefined operating rule or AI model is made through learning.

Here, that the AI model is made through learning may refer that the learning algorithm is applied to a plurality of learning data, so that a predefined operating rule or AI model of a desired characteristic is generated. The learning of the AI model may be performed in a device itself in which AI according to the disclosure is performed, and may be implemented through a separate server/system.

The AI model may include a plurality of neural network layers. Each layer includes a plurality of weight values, and may perform a neural network processing operation through an iterative operation leveraging results of a previous layer and a plurality of weight values. Examples of a neural network may include a convolutional neural network (CNN), a deep neural network (DNN), a recurrent neural network (RNN), a restricted Boltzmann machine (RBM), a deep belief network (DBN), bidirectional recurrent deep neural network (BRDNN), a deep Q-network, a transformer, or the like, but the neural network is not limited thereto unless otherwise specified.

Learning algorithm is a method of using a lot of learning data to train a predetermined target device (e.g., robot) so that the predetermined target device makes a decision by itself or make a prediction. Examples of learning algorithms include, but are not limited to, supervised learning, unsupervised learning, semi-supervised learning, or reinforcement learning, and the algorithm is not limited to the above examples unless otherwise specified.

According to various embodiments, a method disclosed herein may be provided in a computer program product. A computer program product may be traded between a seller and a purchaser as a commodity. A computer program product may be distributed in the form of a machine readable storage medium (e.g., compact disc ROM (CD-ROM)) or distributed online through an application store (e.g., Play-Store™) or distributed (e.g., download or upload) online between two user devices (e.g., smartphones) directly. In the case of on-line distribution, at least a portion of the computer program product (e.g., a downloadable app) may be stored temporarily or at least temporarily in a storage medium such as a manufacturer's server, a server in an application store, or a memory in a relay server.

Embodiments may be implemented as software that includes instructions stored in machine-readable storage media readable by a machine (e.g., a computer). A device may call instructions from a storage medium and that is operable in accordance with the called instructions, including an electronic device (e.g., robot 100).

The machine-readable storage medium may be provided in the form of a non-transitory storage medium. The, "non-transitory" storage medium may not include a signal (e.g., electromagnetic wave) and is tangible, but does not distinguish whether data is permanently or temporarily stored in a storage medium. For example, the "non-transitory storage medium" may include a buffer in which data is temporarily stored.

When the instruction is executed by a processor, the processor may perform the function corresponding to the instruction, either directly or under the control of the processor, using other components. The instructions may include a code generated by a compiler or a code executed by an interpreter.

While the disclosure has been illustrated and described with reference to various example embodiments, it will be understood that the various example embodiments are intended to be illustrative, not limiting. One of ordinary skill in the art will understand that various changes in form and detail may be made without departing from the true spirit and full scope of the disclosure, including the appended claims and their equivalents.

What is claimed is:

1. A robot for acquiring learning data, the robot comprising:
   a speaker;
   a microphone;
   a driver;
   a communication interface;
   a memory storing at least one instruction; and
   at least one processor connected to the speaker, the microphone, the driver, the communication interface, and the memory for controlling the robot,
   wherein the at least one processor, by executing the at least one instruction, is configured to:
      control the communication interface so that the robot transmits a command to an external device around the robot based on pre-stored environment information while the robot is operating in a learning mode,
      output first user speech for learning while the external device, responsive to the command, is outputting a noise, and
      learn a speech recognition model based on the noise and the first user speech for learning acquired through the microphone.

2. The robot of claim 1, wherein the at least one processor is further configured to:
   acquire second user speech uttered by a user while the robot is operating in a speech recognition mode,
   acquire environment information comprising first information about an ambient noise at a time when the second user speech is acquired and second information about the robot, and
   store the environment information in the memory.

3. The robot of claim 2, wherein the pre-stored environment information further comprises third information about a first place where the second user speech is uttered, and
   wherein the at least one processor is further configured to determine a device to output the first user speech for learning based on the first place where the second user speech is uttered.

4. The robot of claim 3, wherein the at least one processor is further configured to:
   based on the first place where the second user speech is uttered and a second place where the robot is located when acquiring the second user speech being a same place, determine that the robot will output the first user speech for learning, and
   based on the first place where the second user speech is uttered and the second place where the robot is located when acquiring the second user speech being different places, determine that a second external device located in the first place where the second user speech is uttered will output the first user speech for learning.

5. The robot of claim 3, wherein the at least one processor is further configured to:
   generate a text-to-speech (TTS) model based on the second user speech, and
      generate the first user speech for learning based on the TTS model.

6. The robot of claim 5, wherein the at least one processor is further configured to generate the first user speech for learning by inputting, into the TTS model, at least one of a predefined text and a text frequently used by the user.

7. The robot of claim 2, wherein the environment information comprises first movement information of the robot when acquiring the second user speech, and
wherein the at least one processor is further configured to control the driver to drive the robot based on second movement information of the robot while the external device, responsive to the command, outputs the noise.

8. The robot of claim 1, wherein the at least one processor is further configured to:
analyze an audio signal to identify a speech period and a non-speech period, wherein the noise and the first user speech for learning acquired through the microphone comprises the audio signal, and
determine a second speech recognition section for learning as having a second start time point and a second end time point based on a first start time point and a first end time point of the speech period of the first user speech for learning as a start time point and an end time point of a first speech recognition section of the robot.

9. The robot of claim 1, wherein the at least one processor is further configured to operate in the learning mode, based on a preset event being detected, and
wherein the preset event comprises at least one of a first event of entering a time zone set by a user, a second event of entering a time zone at which learning data was acquired in the past, and a third event in which the user is detected as going outside.

10. The robot of claim 1, wherein the at least one processor is further configured to control the communication interface to transmit the speech recognition model to an external device capable of recognizing speech.

11. A method of controlling a robot for acquiring learning data, the method comprising:
transmitting a command to an external device around the robot based on pre-stored environment information while the robot is operating in a learning mode;
outputting first user speech for learning while the external device, responsive to the command, is outputting a noise; and
learning a speech recognition model based on the noise and the first user speech for learning acquired through a microphone provided in the robot.

12. The method of claim 11, further comprising:
acquiring second user speech uttered by a user while the robot is operating in a speech recognition mode;
acquiring environment information comprising first information about an ambient noise at a time when the second user speech is acquired and second information about the robot; and
storing the environment information.

13. The method of claim 12, wherein the pre-stored environment information further comprises third information about a first place where the second user speech is uttered, and
wherein the method further comprises determining a device to output the first user speech for learning based on the first place where the second user speech is uttered.

14. The method of claim 13, wherein the determining comprises:
based on the first place where the second user speech is uttered and a second place where the robot is located when acquiring the second user speech being a same place, determining that the robot will output the first user speech for learning; and
based on the first place where the second user speech is uttered and the second place where the robot is located when acquiring the second user speech being different places, determining that a second external device located in the first place where the second user speech is uttered will output the first user speech for learning.

15. The method of claim 13, further comprising:
generating a text-to-speech (TTS) model based on the second user speech; and
generating the first user speech for learning based on the TTS model.

16. The method of claim 11, further comprising driving the robot while the external device, responsive to the command, outputs a first noise.

17. The method of claim 16, wherein the external device is an air conditioner.

18. The method of claim 17, wherein the command specifies strong wind intensity.

19. The method of claim 11, further comprising the robot issuing a second command to an air purifier, the second command specifying operation of the air purifier so that a second noise is generated.

20. A non-transitory computer readable medium storing a program to execute a control method of a robot, the control method comprising:
transmitting a command to an external device around the robot based on pre-stored environment information while the robot is operating in a learning mode;
outputting first user speech for learning while the external device, responsive to the command, is outputting noise; and
learning a speech recognition model based on the noise and the first user speech for learning acquired through a microphone provided in the robot.

* * * * *